United States Patent
Momoki et al.

(10) Patent No.: US 9,291,748 B2
(45) Date of Patent: Mar. 22, 2016

(54) ANTI-REFLECTION STRUCTURE WITH GRADED REFRACTIVE INDEX LAYER AND OPTICAL APPARATUS INCLUDING SAME

(75) Inventors: Kazuhiko Momoki, Koshigaya (JP); Hirokatsu Miyata, Hadano (JP); Masahiko Takahashi, Hachioji (JP); Daisuke Sano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 789 days.

(21) Appl. No.: 13/078,231

(22) Filed: Apr. 1, 2011

(65) Prior Publication Data

US 2011/0242662 A1   Oct. 6, 2011

(30) Foreign Application Priority Data

Apr. 1, 2010   (JP) ................... 2010-084739

(51) Int. Cl.
*G02B 1/10* (2015.01)
*G02B 1/118* (2015.01)

(52) U.S. Cl.
CPC ...................... *G02B 1/118* (2013.01)

(58) Field of Classification Search
CPC .... G02B 21/115; G02B 21/111; G02B 21/11; G02B 21/118
USPC .......... 359/577, 601, 609, 580–590; 428/304.4, 314.2, 314.4, 315.5, 316.6, 428/304
See application file for complete search history.

(56) References Cited

U.S. PATENT DOCUMENTS

| 7,108,810 B2 * | 9/2006 | Nakamura et al. ............. 264/1.7 |
| 2005/0170180 A1 * | 8/2005 | Kawa ............................ 428/402 |

FOREIGN PATENT DOCUMENTS

| EP | 1039347 A1 * | 9/2000 |
| JP | 08-083581 A | 3/1996 |
| JP | 2003-119052 A | 4/2003 |
| JP | 2007-052345 A | 3/2007 |
| JP | 2008-009408 A | 1/2008 |
| JP | 2010-055060 A | 3/2010 |
| JP | 2010055060 A * | 3/2010 |

OTHER PUBLICATIONS

Japanese Office Action cited in Japanese counterpart application No. JP2010-084739, dated Jan. 21, 2014.
Office Action issued in corresponding Japanese Patent Application No. 2010-084739, dated Oct. 7, 2014.

* cited by examiner

*Primary Examiner* — Bumsuk Won
*Assistant Examiner* — Tamara Y Washington
(74) *Attorney, Agent, or Firm* — Rossi, Kimms & McDowell LLP

(57) ABSTRACT

The anti-reflection structure includes a graded refractive index layer that is disposed on a substrate and whose refractive index decreases as a distance from the substrate increases, and a homogeneous layer that is disposed on the graded refractive index layer and whose refractive index is homogeneous. The structure satisfies a condition of nb−na>0.10 where na represents the refractive index of the homogenous layer, and nb represents a homogenous layer side effective refractive index of the graded index refractive index layer.

15 Claims, 12 Drawing Sheets

ANTI-REFLECTION STRUCTURE WITH GRADED REFRACTIVE INDEX LAYER AND OPTICAL APPARATUS INCLUDING SAME

BACKGROUND OF THE INVENTION

1. Field of the Invention

The present invention relates to an anti-reflection structure that is formed on an optical element as a substrate such as a lens.

2. Description of the Related Art

As a structure that is capable of preventing reflection of light on a surface of an optical element such as a lens and is a structure other than anti-reflection films using an interference effect obtained by a dielectric multilayer film, there is known a structure having roughness (convex and concave portions) in which a pitch of the convex portions is equal to or smaller than a wavelength of entering light. Such a structure is hereinafter referred to as a "minute roughness structure". The minute roughness structure utilizes a property of light acting on convex portions whose pitch is equal to or smaller than a wavelength of the light as if the structure has a homogeneous effective refractive index.

Such a minute roughness structure is regarded as having an effective refractive index obtained by averaging a refractive index of a medium constituting the structure and a refractive index of air. Providing to the minute roughness structure such a structure that a medium density decreases from an interface (substrate side interface) between an optical element as a substrate and air toward the air, that is, providing refractive index gradient in which the effective refractive index gradually decreases from the substrate side interface toward the air prevents reflection of light at the substrate side interface.

However, securing physical or mechanical strength of the minute roughness structure is difficult, and a surface of the minute roughness structure cannot be wiped because it has roughness.

Japanese Patent Laid-Open No. 2008-9408 discloses a minute roughness structure that has an anti-reflection function and in which a porous layer as a low refractive index layer is formed in space (concave portions) around convex portions in order to increase mechanical strength of that minute roughness structure having a high aspect ratio. The porous layer has a significantly low refractive index of 1.05, so that the minute roughness structure including the porous layer also provides a good anti-reflection performance. Moreover, filling the space around the convex portions with the porous layer enables prevention of dust invasion into the space.

Furthermore, Japanese Patent Laid-Open No. 08-83581 discloses a thin film having an anti-reflection function utilizing refractive index gradient. Japanese Patent Laid-Open No. 08-83581 discloses that an anti-reflection layer having the refractive index gradient is provided on a surface of an electrically-conductive layer provided on a display surface of a display device in order to prevent static charge thereon and reduce electromagnetic leakage therefrom since a refractive index of the electrically-conductive layer is high.

However, in the minute roughness structure disclosed in Japanese Patent Laid-Open No. 2008-9408, since the space around the convex portions are filled with the porous layer whose refractive index is significantly low, a sufficient mechanical strength cannot be expected. A top surface of the minute roughness structure is formed almost only of the porous layer, so that the mechanical strength of the top surface is equivalent to that of the porous layer, which is low.

Moreover, the anti-reflection thin film disclosed in Japanese Patent Laid-Open No. 08-83581 has a sufficient mechanical strength, but does not have a sufficient anti-reflection performance. The anti-reflection layer provided in the anti-reflection thin film has a low anti-reflection performance only capable of reducing reflection at the electrically-conductive layer, and does not have a high anti-reflection performance capable of preventing reflection at a surface of an optical element.

SUMMARY OF THE INVENTION

The present invention provides an anti-reflection structure having a high mechanical strength of its surface and a high anti-reflection performance, and an optical element and an optical apparatus using the same.

The present invention provides as one aspect thereof an anti-reflection structure including a graded refractive index layer that is disposed on a substrate and whose refractive index decreases as a distance from the substrate increases, and a homogeneous layer that is disposed on the graded refractive index layer and whose refractive index is homogeneous. The following condition is satisfied:

$$nb-na>0.10$$

where na represents the refractive index of the homogenous layer, and nb represents an effective refractive index of a homogenous layer side part of the graded index refractive index layer.

The present invention provides as another aspect thereof an optical element including an anti-reflection structure formed on a surface of the optical element as a substrate. The anti-reflection structure includes a graded refractive index layer that is disposed on the substrate and whose refractive index decreases as a distance from the substrate increases, and a homogeneous layer that is disposed on the graded refractive index layer and whose refractive index is homogeneous. The following condition is satisfied:

$$nb-na>0.10$$

where na represents the refractive index of the homogenous layer, and nb represents an effective refractive index of a homogenous layer side part of the graded index refractive index layer.

The present invention provides as still another aspect thereof an optical apparatus including an optical element provided with the above-described anti-reflection structure.

Further features of the present invention will become apparent from the following description of exemplary embodiments with reference to the attached drawings.

DESCRIPTION OF THE PREFERRED EMBODIMENTS

Figure 1:
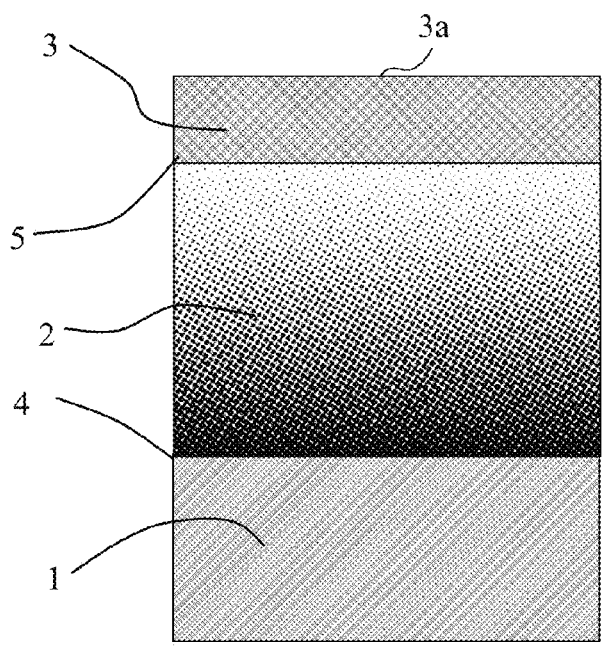
FIG. 1 shows an anti-reflection structure that is Embodiment 1 of the present invention.

Exemplary embodiments of the present invention will hereinafter be described with reference to the accompanying drawings.

FIGS. 1-6 show anti-reflection structures that are first to sixth embodiments (Embodiments 1-6) of the present invention. First, description will be made of an outline of the anti-reflection structure which is common to Embodiments 1-6.

The anti-reflection structure of each embodiment of the present invention is formed on a surface of a substrate 1 that is a base member. The anti-reflection structure includes at least a graded refractive index layer 2 that is formed on a substrate side, and a low refractive index layer (homogenous layer) 3 that is formed on a side opposite to the substrate 1 with respect to the graded refractive index layer 2 and whose refractive index is homogenous (even). In other words, the anti-reflection structure includes, in order from the substrate side, the graded refractive index layer 2 and the low refractive index layer 3.

The graded refractive index layer 2 has a graded refractive index (also referred to as "refractive index gradient") in which the refractive index gradually decreases from an interface 4 between the substrate 1 and the graded refractive index layer 2 toward an interface 5 between the low refractive index layer 3 and the graded refractive index layer 2, that is, as a distance from the substrate 1 increases. The interface 4 is hereinafter referred to as a "substrate side interface 4", and the interface 5 is hereinafter referred to as a "low refractive index layer side interface 5".

The graded refractive index layer 2 may be formed by, for example, a base layer having roughness including convex portions that forms a concave area therearound and whose pitch is equal to or smaller than a wavelength of light entering the anti-reflection structure, and a low refractive index medium (hereinafter referred to as a "filled medium") with which the concave area is filled and whose refractive index is lower than that of the base layer. In this case, a filling rate of the filled medium in the graded refractive index layer 2 may increase as the distance from the substrate 1 increases. The base layer may be formed of a same medium as that of the substrate 1, and the filled medium may be a same medium as that of the low refractive index layer 3.

At least one intermediate layer (intermediate homogeneous layer) whose refractive index is homogeneous (even) may be provided between the substrate 1 and the graded refractive index layer 2.

The anti-reflection structure of each embodiment satisfies the following condition (1):

$$nb-na > 0.10 \tag{1}$$

where na represents the refractive index of the low refractive index layer (homogenous layer) 3, and nb represents an effective refractive index of a low refractive index layer side part (homogenous layer side part) of the graded refractive index layer 2. The low refractive index layer side part means part closer to the low refractive index layer 3 (that is, to the low refractive index layer side interface 5) than to the substrate 1.

Moreover, it is desirable that the anti-reflection structure of each embodiment satisfy the following condition (2):

$$1.10 < na < 1.35 \tag{2}$$

Furthermore, it is desirable that the anti-reflection structure of each embodiment satisfy the following condition (3):

$$|ns-nc| < 0.10 \tag{3}$$

where ns represents a refractive index of the substrate 1, and nc represents an effective refractive index of a substrate side part of the graded refractive index layer 2. The substrate side part means part may be part closest to the substrate side interface 4, in other words, at the substrate side interface 4.

In addition, it is desirable that the anti-reflection structure of each embodiment satisfy the following condition (4):

$$0.1 < na \cdot Da/\lambda o < 0.5 \tag{4}$$

where Da represents a thickness of the low refractive index layer 3, and $\lambda o$ is 550 nm.

Table 9 shows values of the above-described conditions (1) to (4) of numerical examples corresponding to Embodiments 1 to 6 described later.

Hereinafter, description will be made of a relationship between an anti-reflection function and mechanical strength of the anti-reflection structure of each embodiment.

Media whose refractive index is lower than 1.30 (or 1.35) generally include a porous medium such as mesoporous silica ($SiO_2$). Such porous media have refractive indices different from each other depending on a rate of holes (vacancies) occupying each medium. The rate of the holes is hereinafter referred to as a "hole rate". A higher hole rate of the medium provides a lower refractive index thereof. However, a lower hole rate of the medium provides a higher mechanical strength thereof. Therefore, it is impossible to meet both the requirements.

Thus, each embodiment reduces the refractive index of the low refractive index layer 3 to a range from about 1.15 to about 1.25 in order to secure mechanical strength of a surface of the anti-reflection structure. It is difficult for the mechanical strength to lower the refractive index of the low refractive index layer 3 to a range less than the above-described range. In other words, in order to secure a sufficient mechanical strength, it is desirable to set the refractive index of the low refractive index layer 3 to be equal to or higher than 1.20.

Such a sufficient mechanical strength limits a lowest value of the refractive index of the low refractive index layer 3, which causes a difference of the refractive index of the low refractive index layer 3 from that of air. Therefore, Fresnel reflection is generated at an interface (surface) 3a between the low refractive index layer 3 and the air.

Thus, each embodiment provides a refractive index difference to the low refractive index layer 3 and the graded refractive index layer 2 at the low refractive index side interface 5 so as to intentionally generate the Fresnel reflection at a same level as that of the Fresnel reflection generated at the interface 3a between the low refractive index layer and the air. Moreover, each embodiment sets a thickness of the low refractive index layer 3 to a value about ¼λ so as to cause the Fresnel reflections to mutually interfere, thereby canceling out both the Fresnel reflections.

Furthermore, each embodiment gradually increases the refractive index of the graded refractive index layer 2 from the low refractive index side interface 5 to the substrate side interface 4. Providing an almost same refractive index as that of the substrate 1 to the graded refractive index layer 2 at the substrate side interface 4 eliminates the Fresnel reflection thereat. Such refractive index gradient should be gentle, and setting a thickness of the graded refractive index layer 2 to be equal to more than about ½λ makes it possible to reduce reflectance of the graded refractive index layer 2.

The satisfaction of these conditions enables realization of an anti-reflection structure with a high anti-reflection characteristic.

Embodiment 1

Figure 14:
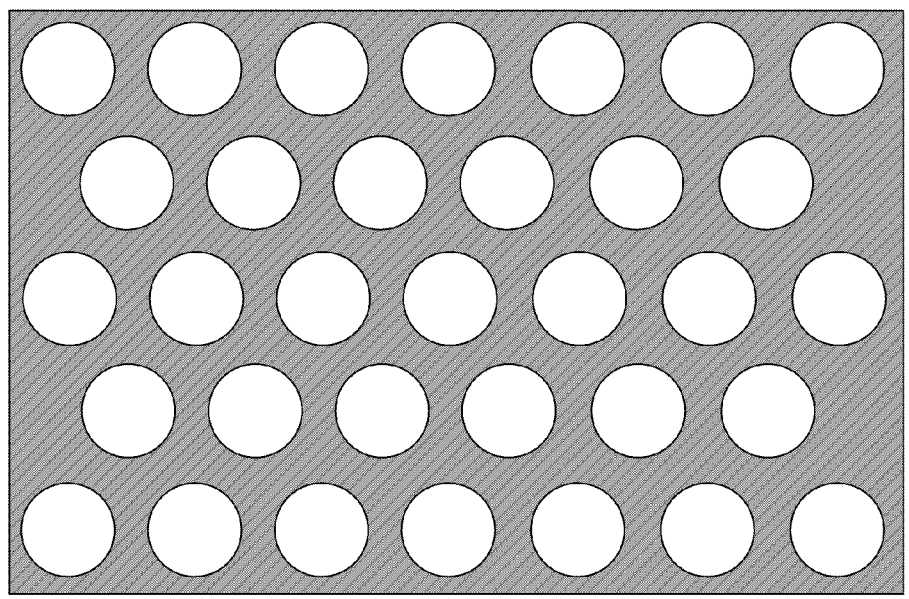
FIG. 14 shows a structure of mesoporous silica.

A more detailed description will be made of the anti-reflection structure of Embodiment 1 with reference to FIG. 1. The graded refractive index layer 2 and the low refractive index layer 3 are laminated on the surface of the substrate 1. The refractive index of the graded refractive index layer 2, as described above, decreases from the substrate side interface 4 toward the low refractive index layer side interface 5. The low refractive index layer 3 is a porous layer (mesoporous layer) being formed of mesoporous silica and having an even refractive index. The mesoporous silica includes a lot of minute holes in silica as shown in FIG. 14. The refractive index of the low refractive index layer 3 is decided depending on the rate (hole rate) of the minute holes occupying the mesoporous silica. A higher hole rate of the mesoporous silica provides a lower refractive index.

The graded refractive index layer 2 is a layer formed by binary vapor deposition of $TiO_2$ and $SiO_2$. The refractive index of the graded refractive index layer 2 formed by the binary vapor deposition of $TiO_2$ and $SiO_2$ changes depending on a mixing ratio of the two oxides. A higher density of $SiO_2$ than that of $TiO_2$ provides a lower refractive index than that for a lower density of $SiO_2$ than that of $TiO_2$.

The graded refractive index layer 2 has a density gradient in which the density of $SiO_2$ is lowest at the substrate side interface 4 and increases as a distance to the low refractive index layer side interface 5 decreases (that is, as a distance from the substrate 1 increases). Conversely, the graded refractive index layer 2 has a density gradient in which the density of $TiO_2$ is highest at the substrate side interface 4 and decreases as the distance to the low refractive index layer side interface 5 decreases (that is, as the distance from the substrate 1 increases). Such a density gradient provides to the graded refractive index layer 2 a highest refractive index at the substrate side interface 4 and decreases the refractive index as the distance to the low refractive index layer side interface 5 decreases.

Figure 7A:
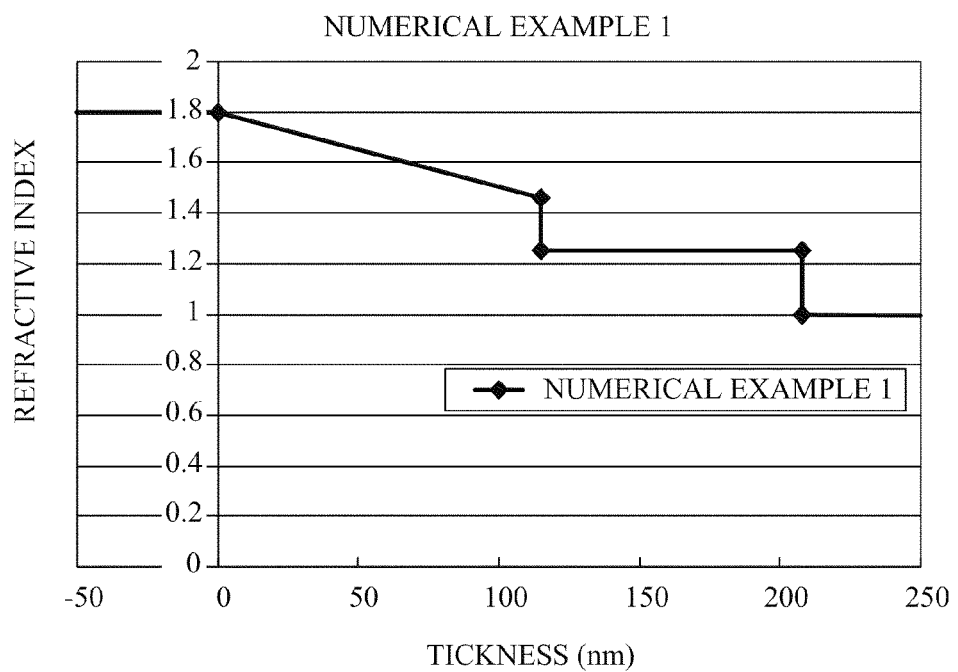
FIGS. 7A and 7B show refractive index structures of Numerical Examples 1 and 2 of the present invention.

Table 1 shows Numerical Example 1 of the anti-reflection structure corresponding to this embodiment. FIG. 7A shows a refractive index structure (refractive index profile) of the anti-reflection structure of Numerical Example 1 where a horizontal axis shows layer thicknesses (film thicknesses) (nm), and a vertical axis shows the refractive indices of the respective layers. For descriptive purposes, the layer thickness is shown as a distance from the substrate side interface 4 defined as 0, and a direction from the substrate 1 toward the low refractive index layer 3 is defined as a plus direction. These definitions also apply to refractive index profiles of other numerical examples described later.

The refractive index of the substrate 1 is 1.80. The refractive index of the graded refractive index layer 2 at the substrate side interface 4 is same as that of the substrate 1. Moreover, the refractive index of the graded refractive index layer 2 at the low refractive index layer side interface 5 is 1.46. On the other hand, the refractive index of the low refractive index layer 3 is 1.25, and thus the graded refractive index layer 2 and the low refractive index layer 3 have a refractive index difference of 0.21 therebetween at the low refractive index layer side interface 5.

Table 2 shows designed values of Numerical Example 1. The hole rate of the mesoporous silica forming the low refractive index layer 3 is 46%. A content ratio of $SiO_2$ and $TiO_2$ in the grated refractive index layer 2 at the substrate side interface 4 is 59:41, and gradually increases up to a content ratio of 100:0 at the low refractive index layer side interface 5.

Figure 10A:
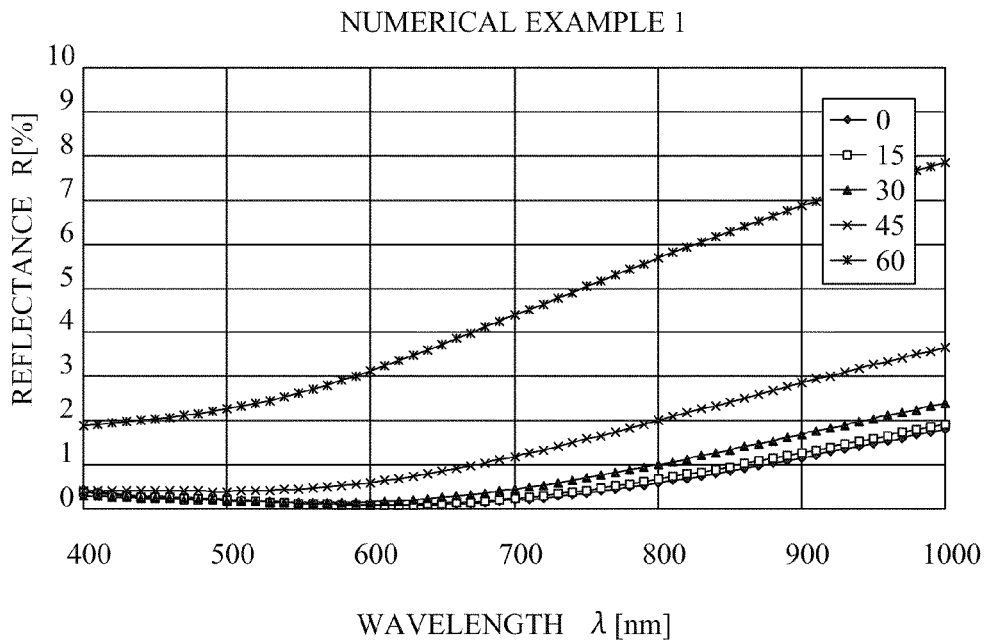
FIGS. 10A and 10B show calculated values of spectral reflectances of Numerical Examples 1 and 2.

FIG. 10A shows spectral reflectances (calculated values) of Numerical Example 1. FIG. 10A is a graph plotting the spectral reflectances when incident angles of the entering light are 0°, 15°, 30°, 45° and 60° in a wavelength range from a visible wavelength range from about 400 nm to about 700 nm to an infrared wavelength of 1000 nm. This also applies to graphs showing the spectral reflectances of the other numerical examples described later.

As shown in this graph, the anti-reflection structure of Numerical Example 1 has sufficiently low reflectances, that is, a sufficiently high anti-reflection performance in the incident angle range from 0° to 45° over the entire visible wavelength range. Moreover, the anti-reflection structure of Numerical Example 1 has a low reflectance of about 4.5% at a high incident angle of 60° over the entire visible wavelength range. The conventional anti-reflection structure using the interference effect of the multilayer film generally has a characteristic in which the reflectance drastically increases in wavelength ranges other than the wavelength of the entering light (hereinafter referred to as a "using wavelength"). However, in each embodiment, the reflectance gradually changes even in the infrared wavelength range, and the reflectance at the infrared wavelength of 1000 nm increases by only about 2% in the incident angle range from 0° to 30°.

Figure 7B:
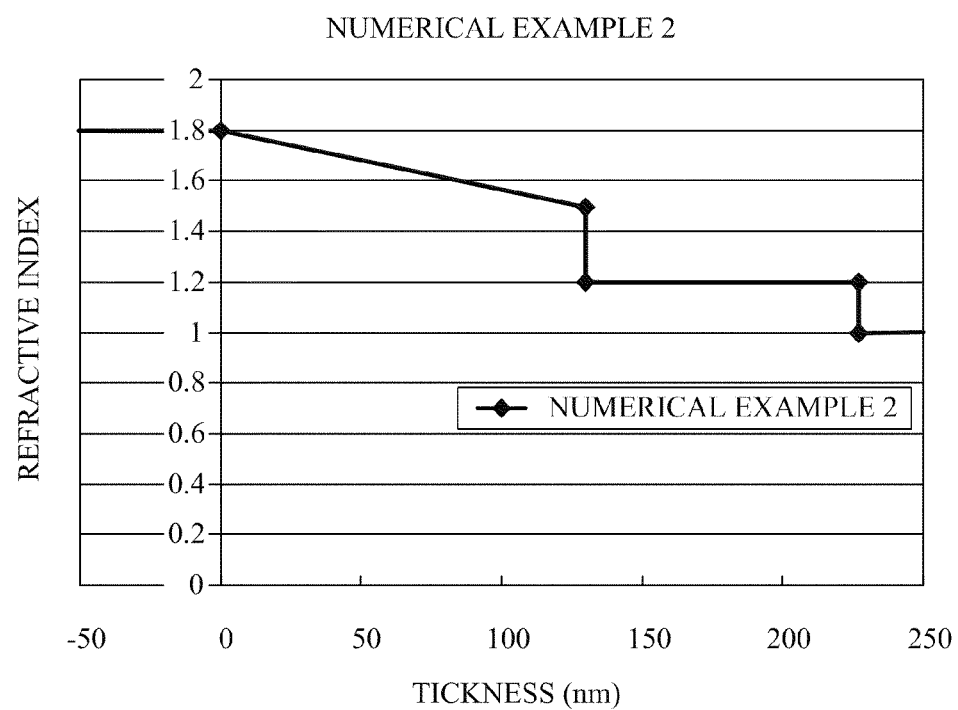

Moreover, Table 1 also shows Numerical Example 2 that is another numerical example of the anti-reflection structure corresponding to Embodiment 1. FIG. 7B shows a refractive index profile of the anti-reflection structure of Numerical Example 2. The refractive index of the substrate 1 is 1.80. The refractive index of the graded refractive index layer 2 at the substrate side interface 4 is same as that of the substrate 1. The refractive index of the graded refractive index layer 2 at the low refractive layer side interface 5 is 1.49. On the other hand, the refractive index of the low refractive index layer 3 is 1.20, and thus the graded refractive index layer 2 and the low refractive index layer 3 have a refractive index difference of 0.29 therebetween at the low refractive index layer side interface 5.

Table 2 shows designed values of Numerical Example 2. The hole rate of the mesoporous silica forming the low refractive index layer 3 is 56%. A content ratio of $SiO_2$ and $TiO_2$ in the grated refractive index layer 2 at the substrate side interface 4 is 59:41, and gradually increases up to a content ratio of 96:4 at the low refractive index layer side interface 5.

Figure 10B:
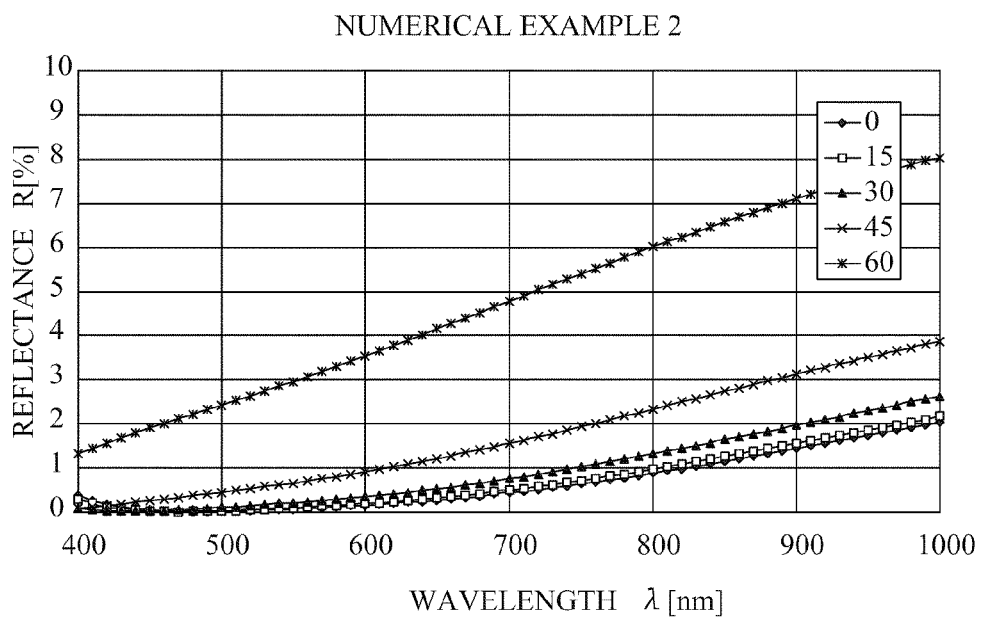

FIG. 10B shows spectral reflectances (calculated values) of Numerical Example 2. The anti-reflection structure of Numerical Example 2 has sufficiently low reflectances, that is, a sufficiently high anti-reflection performance in the incident angle range from 0° to 45° over the entire visible wavelength range. Moreover, the anti-reflection structure of Numerical Example 2 has a low reflectance of about 5% at a high incident angle of 60° over the entire visible wavelength range.

Figure 8A:
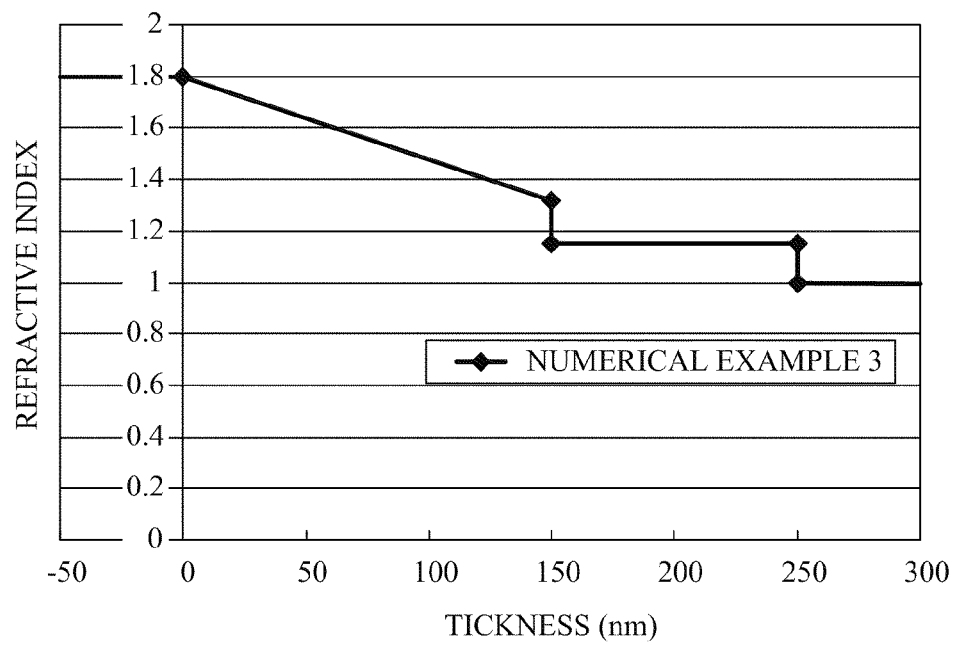
FIGS. 8A and 8B show refractive index structures of Numerical Examples 3 and 4 of the present invention.
Figure 8B:
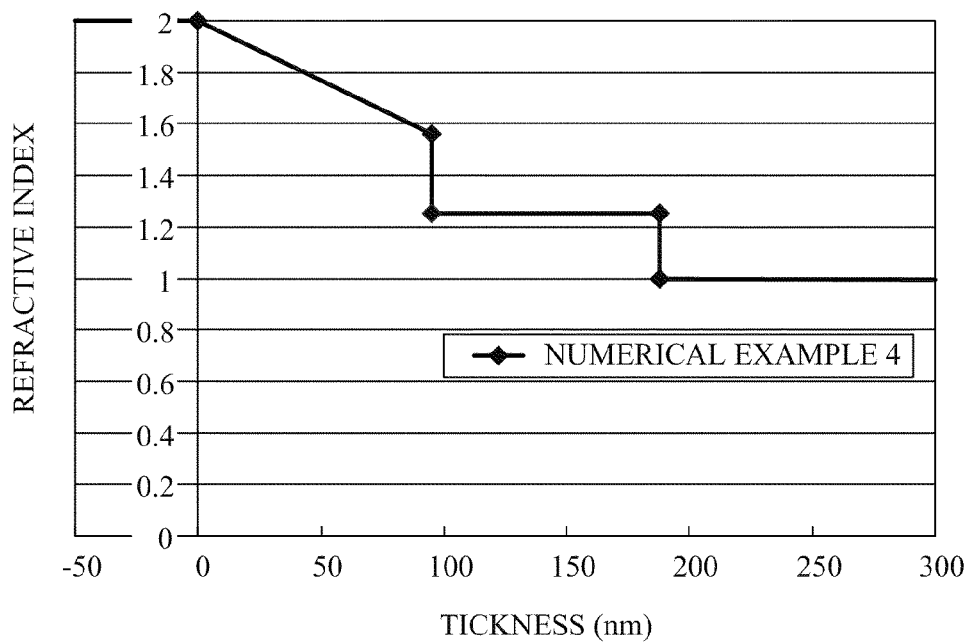

Moreover, Table 1 also shows Numerical Example 4 that is still another numerical example of the anti-reflection structure corresponding to Embodiment 1. FIG. 8B shows a refractive index profile of the anti-reflection structure of Numerical Example 4. The refractive index of the substrate 1 is 2.00. The refractive index of the graded refractive index layer 2 at the substrate side interface 4 is same as that of the substrate 1. The refractive index of the graded refractive index layer 2 at the low refractive layer side interface 5 is 1.56. On the other hand, the refractive index of the low refractive index layer 3 is 1.25, and thus the graded refractive index layer 2 and the low refractive index layer 3 have a refractive index difference of 0.31 therebetween at the low refractive index layer side interface 5.

Table 2 shows designed values of Numerical Example 4. The hole rate of the mesoporous silica forming the low refractive index layer 3 is 46%. A content ratio of $SiO_2$ and $TiO_2$ in the grated refractive index layer 2 at the substrate side interface 4 is 35:65, and gradually increases up to a content ratio of 88:12 at the low refractive index layer side interface 5.

Figure 11A:
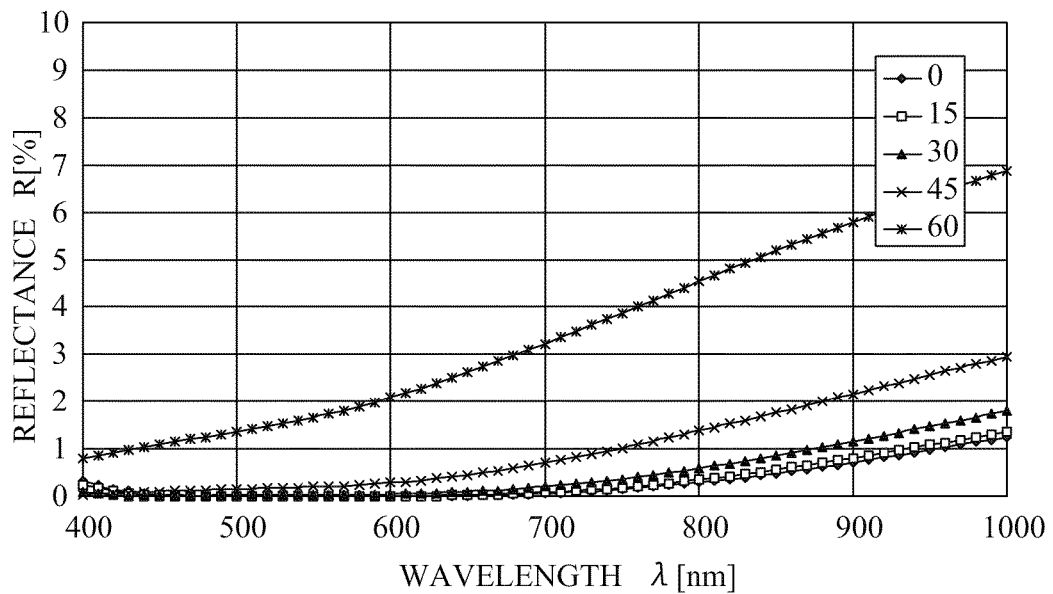
FIGS. 11A and 11B show calculated values of spectral reflectances of Numerical Examples 3 and 4.
Figure 11B:
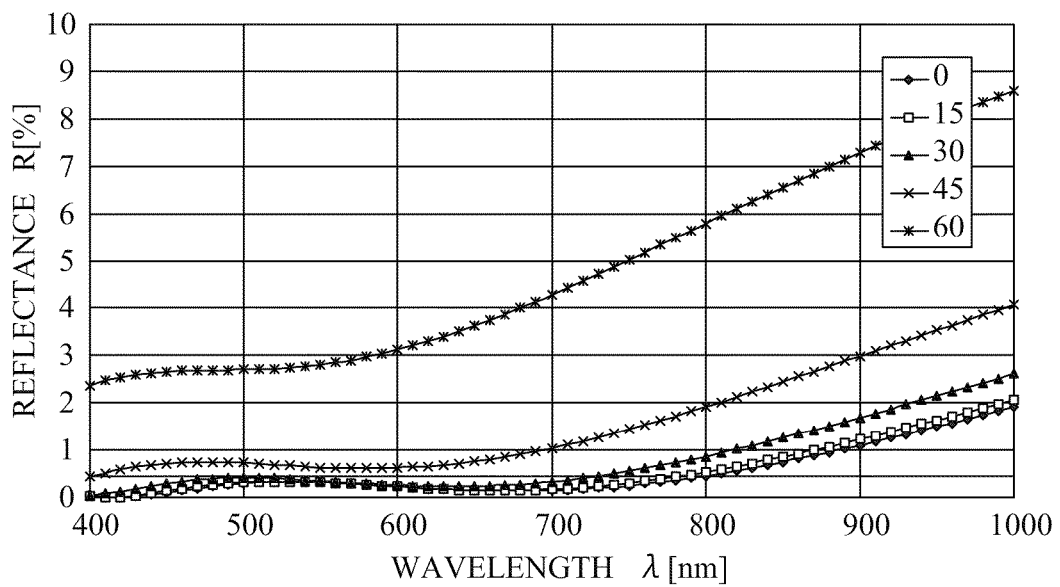

FIG. 11B shows spectral reflectances (calculated values) of Numerical Example 4. The anti-reflection structure of Numerical Example 4 has sufficiently low reflectances, that is, a sufficiently high anti-reflection performance in the incident angle range from 0° to 45° over the entire visible wavelength range. Moreover, the anti-reflection structure of Numerical Example 4 has a low reflectance of about 4.3% at a high incident angle of 60° over the entire visible wavelength range.

Embodiment 2

Figure 2:
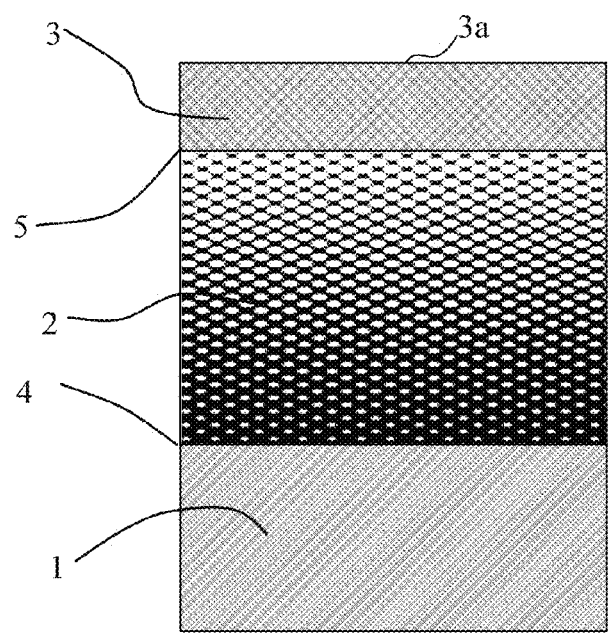
FIG. 2 shows an anti-reflection structure that is Embodiment 2 of the present invention.

A more detailed description will be made of the anti-reflection structure of Embodiment 2 with reference to FIG. 2. The graded refractive index layer 2 and the low refractive index layer 3 are laminated on the surface of the substrate 1. The refractive index of the graded refractive index layer 2, as described above, decreases from the substrate side interface 4 toward the low refractive index layer side interface 5. As in Embodiment 1, the low refractive index layer 3 is a porous layer being formed of mesoporous silica and having an even refractive index.

Figure 15:
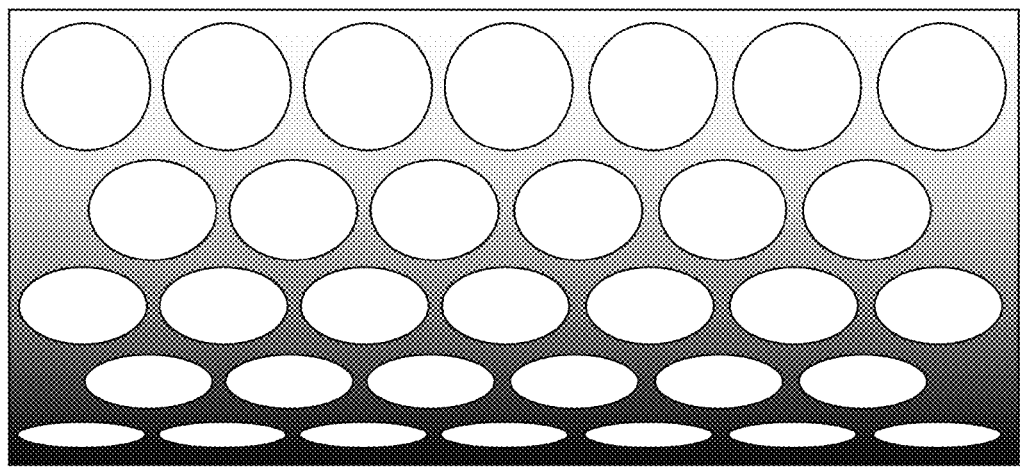
FIG. 15 shows a structure of mesoporous $SnO_2$ having refractive index gradient.

The graded refractive index layer 2 is a porous layer (mesoporous layer) being formed of mesoporous $SnO_2$ and having a structure in which a lot of minute holes are formed in $SnO_2$. As with the mesoporous silica, a higher hole rate of the mesoporous $SnO_2$ provides a lower refractive index. In this embodiment, as shown in FIG. 15, the hole rate in the graded refractive index layer 2 decreases as a distance to the substrate side interface 4 decreases. Conversely, the hole rate increases as a distance to the low refractive index layer side interface 5 decreases. The refractive index of the graded refractive index layer 2 thereby decreases from the substrate side interface 4 toward the low refractive index layer side interface 5.

Table 3 shows designed values of Numerical Example 1 of the anti-reflection structure corresponding to this embodiment. The hole rate of the mesoporous silica in the low refractive index layer 3 is 46%. The hole rate of the mesoporous $SnO_2$ in the graded refractive index layer 2 gradually changes from 20% at the substrate side interface 4 to 54% at the low refractive index layer side interface 5. Thus, a refractive index profile of Numerical Example 1 is as shown in FIG. 7A, and spectral reflectances thereof are as shown in FIG. 10A.

Moreover, Table 3 shows designed values of Numerical Example 2 that is another numerical example of the anti-reflection structure corresponding to Embodiment 2. The hole rate of the mesoporous silica in the low refractive index layer 3 is 56%. The hole rate of the mesoporous $SnO_2$ in the graded refractive index layer 2 gradually changes from 20% at the substrate side interface 4 to 51% at the low refractive index layer side interface 5. Thus, a refractive index profile of Numerical Example 2 is as shown in FIG. 7B, and spectral reflectances thereof are as shown in FIG. 10B.

Table 1 also shows Numerical Example 3 that is still another numerical example of the anti-reflection structure corresponding to Embodiment 2. FIG. 8A shows a refractive index profile of the anti-reflection structure of Numerical Example 3.

The refractive index of the substrate 1 is 1.80. The refractive index of the graded refractive index layer 2 at the substrate side interface 4 is same as that of the substrate 1. The refractive index of the graded refractive index layer 2 at the low refractive layer side interface 5 is 1.32. On the other hand, the refractive index of the low refractive index layer 3 is 1.15, and thus the graded refractive index layer 2 and the low refractive index layer 3 have a refractive index difference of 0.17 therebetween at the low refractive index layer side interface 5.

Table 3 shows designed value of Numerical Example 3. The hole rate of the mesoporous silica in the low refractive index layer 3 is 67%. The hole rate of the mesoporous $SnO_2$ in the graded refractive index layer 2 gradually changes from 20% at the substrate side interface 4 to 68% at the low refractive index layer side interface 5. Thus, spectral reflectances of Numerical Example 3 are as shown in FIG. 11A.

Moreover, Table 3 shows designed values of Numerical Example 4 that is yet still another numerical example of the anti-reflection structure corresponding to Embodiment 2. The hole rate of the mesoporous silica in the low refractive index layer 3 is 46%. The hole rate of the mesoporous $SnO_2$ in the graded refractive index layer 2 gradually changes from 0% at the substrate side interface 4 to 44% at the low refractive index layer side interface 5. Thus, a refractive index profile of Numerical Example 4 is as shown in FIG. 8B, and spectral reflectances thereof are as shown in FIG. 11B.

Embodiment 3

Figure 3:
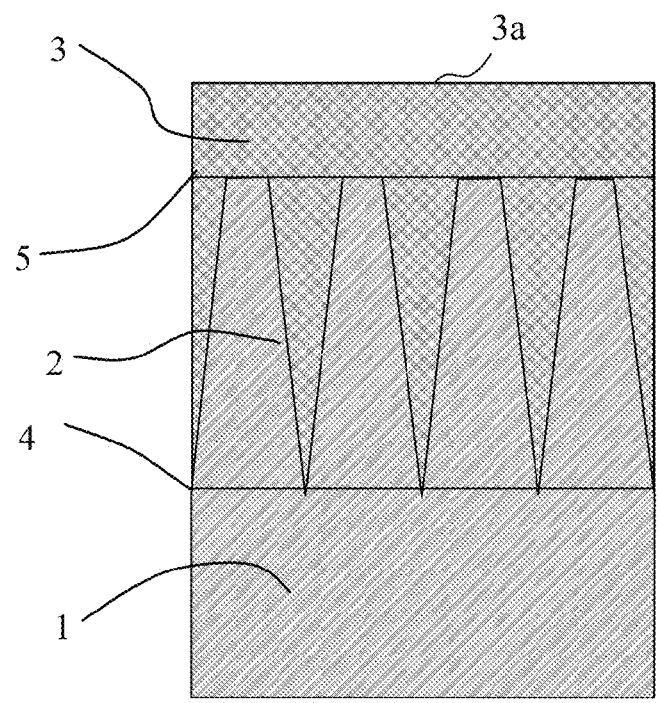
FIG. 3 shows an anti-reflection structure that is Embodiment 3 of the present invention.

A more detailed description will be made of the anti-reflection structure of Embodiment 3 with reference to FIG. 3. The graded refractive index layer 2 and the low refractive index layer 3 are laminated on the surface of the substrate 1. The refractive index of the graded refractive index layer 2, as described above, decreases from the substrate side interface 4 toward the low refractive index layer side interface 5. As in Embodiment 1, the low refractive index layer 3 is a porous layer (mesoporous layer) being formed of mesoporous silica and having an even refractive index.

The graded refractive index layer 2 includes a base layer being formed of a same medium as that of the substrate 1 and having minute roughness (minute convex portions forming concave area therearound). A pitch (dimension) of the convex portions is about ½λ that is smaller than the using wavelength λ. Moreover, the convex portions occupy a volume of almost 100% in the graded refractive index layer 2 at the substrate side interface 4, and each convex portion has a so-called circular truncated cone shape or truncated pyramid shape whose section size decreases toward the low refractive index layer side interface 5 and which has a top end face at the low refractive index layer side interface 5. The concave area around the convex portions is filled with the above-described mesoporous silica as the filled medium whose refractive index is lower than that of the base layer. A filling rate of the mesoporous silica in the graded refractive index layer 2 increases as a distance from the substrate 1 increases, and thereby the refractive index of the graded refractive index layer 2 decreases from the substrate side interface 4 toward the low refractive index layer side interface 5.

Moreover, the circular truncated cone shape or truncated pyramid shape of the convex portion makes the refractive index of the graded refractive index layer 2 discontinuous at the top end face, which forms the low refractive index layer side interface 5 between the graded refractive index layer 2 and the low refractive index layer 3.

Table 4 shows designed values of Numerical Example 1 of the anti-reflection structure corresponding to this embodiment. The hole rate of the mesoporous silica in the low refractive index layer 3 is 46%. The filling rate of the filled medium in the graded refractive index layer 2 at the substrate side interface 4 is 100%. The refractive index thus continuously changes from the substrate 1 in the graded refractive index layer 2.

On the other hand, the filing rate of the filled medium is 38% at the low refractive index layer interface 5, that is, the mesoporous silica is contained at a rate of 62%. The refractive index at the low refractive index layer interface 5 is 1.46, which generates a refractive index difference from the low refractive index layer 3.

A refractive index profile of Numerical Example 1 is as shown in FIG. 7A, and spectral reflectances thereof are as shown in FIG. 10A.

Table 4 also shows designed values of Numerical Example 2 of the anti-reflection structure corresponding to this embodiment. The hole rate of the mesoporous silica in the low refractive index layer 3 is 56%. The filling rate of the filled medium in the graded refractive index layer 2 at the substrate side interface 4 is 100%. The refractive index thus continuously changes from the substrate 1 in the graded refractive index layer 2.

On the other hand, the filing rate of the filled medium is 48% at the low refractive index layer interface 5, that is, the mesoporous silica is contained at a rate of 52%. The refractive index at the low refractive index layer interface 5 is 1.49, which generates a refractive index difference from the low refractive index layer 3.

A refractive index profile of Numerical Example 2 is as shown in FIG. 7B, and spectral reflectances thereof are as shown in FIG. 10B.

Table 4 further shows designed values of Numerical Example 3 of the anti-reflection structure corresponding to this embodiment. The hole rate of the mesoporous silica in the low refractive index layer 3 is 67%. The filling rate of the filled medium in the graded refractive index layer 2 at the substrate side interface 4 is 100%. The refractive index thus continuously changes from the substrate 1 in the graded refractive index layer 2.

On the other hand, the filing rate of the filled medium is 26% at the low refractive index layer interface 5, that is, the mesoporous silica is contained at a rate of 74%. The refractive index at the low refractive index layer interface 5 is 1.32, which generates a refractive index difference from the low refractive index layer 3.

A refractive index profile of Numerical Example 3 is as shown in FIG. 8A, and spectral reflectances thereof are as shown in FIG. 11A.

Table 4 further shows designed values of Numerical Example 4 of the anti-reflection structure corresponding to this embodiment. The hole rate of the mesoporous silica in the low refractive index layer 3 is 46%. The filling rate of the filled medium in the graded refractive index layer 2 at the substrate side interface 4 is 100%. The refractive index thus continuously changes from the substrate 1 in the graded refractive index layer 2.

On the other hand, the filing rate of the filled medium is 41% at the low refractive index layer interface 5, that is, the mesoporous silica is contained at a rate of 59%. The refractive index at the low refractive index layer interface 5 is 1.56, which generates a refractive index difference from the low refractive index layer 3.

A refractive index profile of Numerical Example 4 is as shown in FIG. 8B, and spectral reflectances thereof are as shown in FIG. 11B.

Embodiment 4

Figure 4:
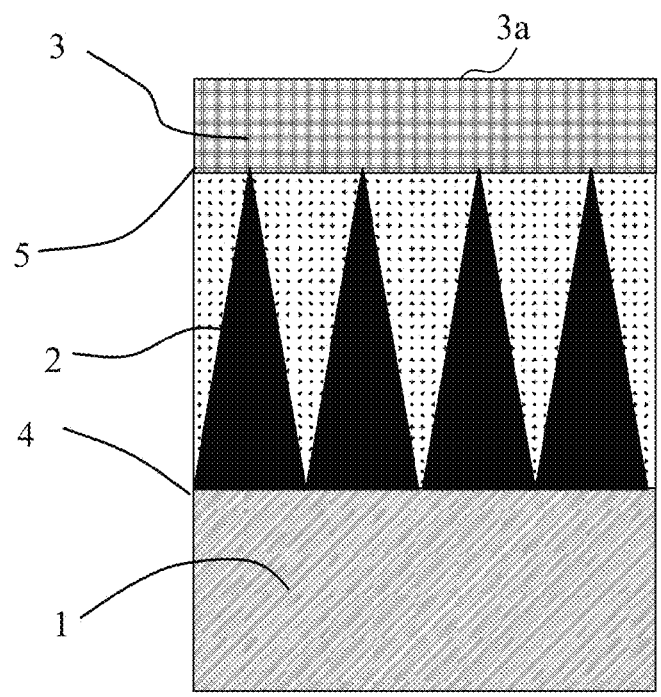
FIG. 4 shows an anti-reflection structure that is Embodiment 4 of the present invention.
Figure 16:
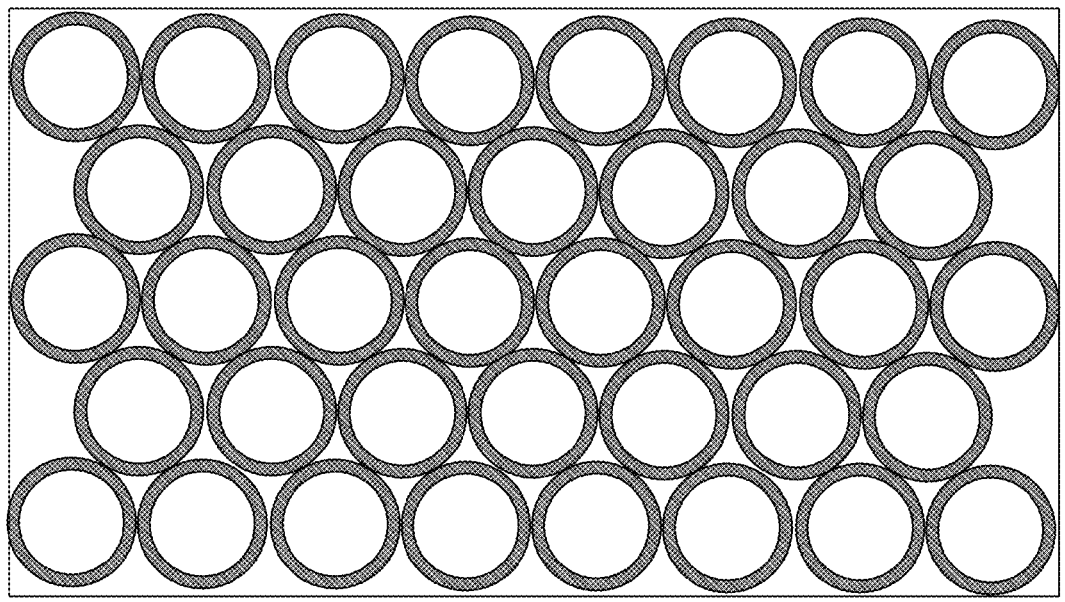
FIG. 16 shows a structure of hollow $MgF_2$.

A more detailed description will be made of the anti-reflection structure of Embodiment 4 with reference to FIG. 4. The graded refractive index layer 2 and the low refractive index layer 3 are laminated on the surface of the substrate 1. The refractive index of the graded refractive index layer 2, as described above, decreases from the substrate side interface 4 toward the low refractive index layer side interface 5. The low refractive index layer 3 is a porous layer being formed of hollow $MgF_2$ (magnesium fluoride) and having an even refractive index. The hollow $MgF_2$ is, as shown in FIG. 16, formed of a lot of spherical hollow $MgF_2$ particles mutually combined, and a refractive index thereof is low since a lot of voids exist inside of each hollow $MgF_2$ particle and around the hollow $MgF_2$ particles.

In the graded refractive index layer 2, $Al_2O_3$ (alumina) having a minute petaloid structure is formed, and a concave area in the petaloid structure is filled with mesoporous $SnO_2$. That is, the graded refractive index layer 2 is formed of a mixed medium of $Al_2O_3$ and mesoporous $SnO_2$. A lower portion of the petaloid structure is disposed at the substrate side interface 4. A density (rate) of the petaloid structure at the substrate side interface 4 is 100%. On the other hand, a density of the petaloid structure at its upper portion is almost 0%.

The graded refractive index layer 2 having such a structure has a high refractive index equivalent to that of $Al_2O_3$ at the substrate side interface 4. Moreover, the graded refractive index layer 2 has a refractive index equivalent to that of the mesoporous $SnO_2$ at the low refractive index layer side interface 5.

Table 5 shows designed values of Numerical Example 1 of the anti-reflection structure corresponding to this embodiment. The hole rate of the hollow $MgF_2$ forming the low refractive index layer 3 is 34%. The hole rate of the mesoporous $SnO_2$ with which the concave area in the petaloid structure of the graded refractive index layer 2 is filled is 54%. Thus, a refractive index profile of Numerical Example 1 is as shown in FIG. 7A, and spectral reflectances thereof are as shown in FIG. 10A.

Table 5 also shows designed values of Numerical Example 2 of the anti-reflection structure corresponding to this embodiment. The hole rate of the hollow $MgF_2$ forming the low refractive index layer 3 is 47%. The hole rate of the mesoporous $SnO_2$ with which the concave area in the petaloid structure of the graded refractive index layer 2 is filled is 51%.

Thus, a refractive index profile of Numerical Example 2 is as shown in FIG. 7B, and spectral reflectances thereof are as shown in FIG. 10B.

Table 5 further shows designed values of Numerical Example 3 of the anti-reflection structure corresponding to this embodiment. The hole rate of the hollow $MgF_2$ forming the low refractive index layer 3 is 60%. The hole rate of the mesoporous $SnO_2$ with which the concave area in the petaloid structure of the graded refractive index layer 2 is filled is 68%. Thus, a refractive index profile of Numerical Example 3 is as shown in FIG. 8A, and spectral reflectances thereof are as shown in FIG. 11A.

Embodiment 5

Figure 5:
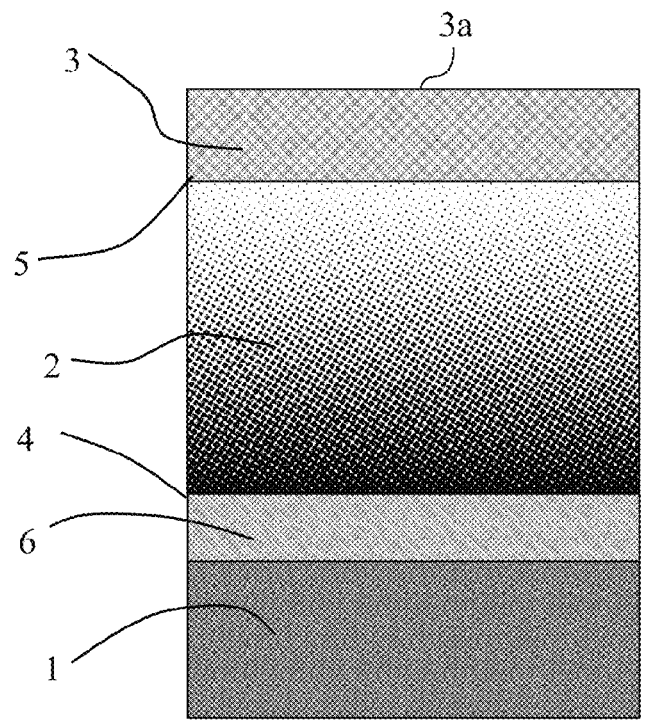
FIG. 5 shows an anti-reflection structure that is Embodiment 5 of the present invention.

A more detailed description will be made of the anti-reflection structure of Embodiment 5 (Numerical Example 5) with reference to FIG. 5. Tables 6 and 7 show designed values of Numerical Example 5.

This embodiment provides the graded refractive index layer 2 and the low refractive index layer 3 that are formed as well as those in Embodiment on the surface of the substrate 1 whose refractive index is 2.00, and provides a lower homogeneous layer (intermediate layer) 6 having an even refractive index of 1.80 between the substrate 1 and the graded refractive index layer 2.

The graded refractive index layer 2 has a refractive index of 1.60 at the substrate side interface 4 between the graded refractive index layer 2 and the lower homogeneous layer 6, which is a lower refractive index than that of the lower homogeneous layer 6. The refractive index of the graded refractive index layer 2 decreases from the substrate side interface 4 toward the low refractive index layer side interface 5. The refractive index of the graded refractive index layer 2 at the low refractive index layer side interface 5 is 1.46. The low refractive index layer 3 has a refractive index of 1.25.

Figure 9A:
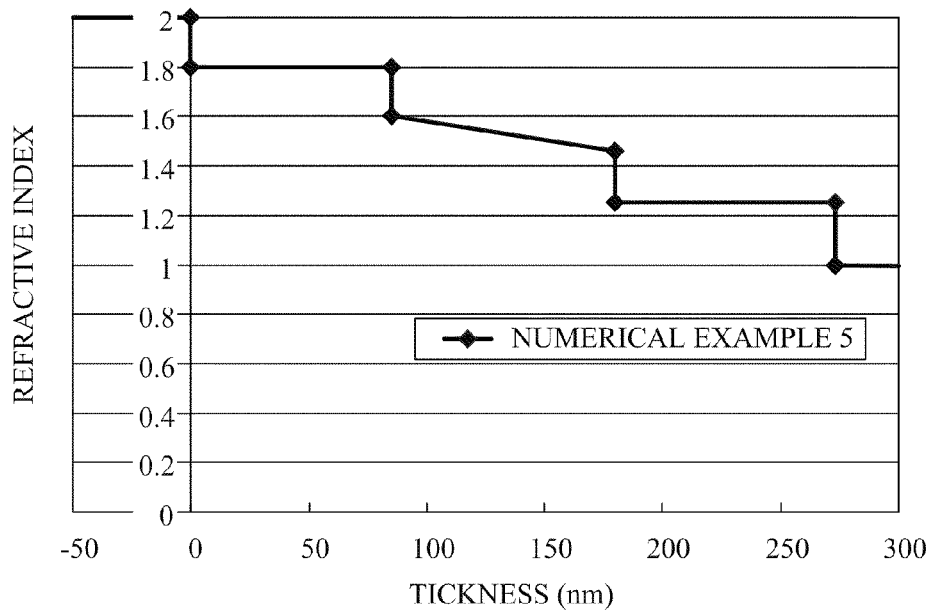
FIGS. 9A and 9B show refractive index structures of Numerical Examples 5 and 6 of the present invention.

In Numerical Example 5, the hole rate of the mesoporous silica forming the low refractive index layer 3 is 46%. A content ratio of $SiO_2$ and $TiO_2$ in the grated refractive index layer 2 at the substrate side interface 4 is 83:17, and gradually increases up to a content ratio of 100:0 at the low refractive index layer side interface 5. A refractive index profile of Numerical Example 5 is as shown in FIG. 9A, and spectral reflectances thereof are as shown in FIG. 12A.

Figure 12A:
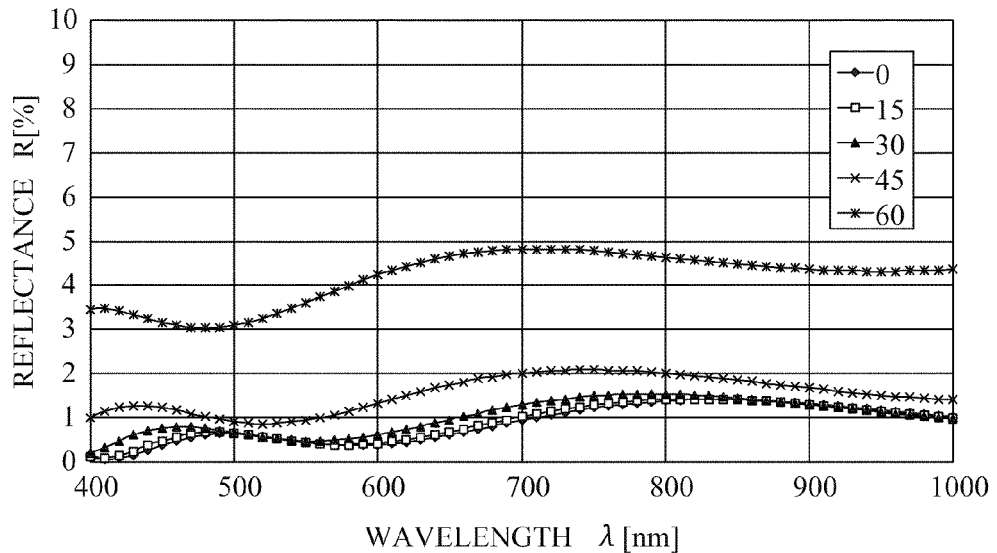
FIGS. 12A and 12B show calculated values of spectral reflectances of Numerical Examples 5 and 6.

As shown in FIG. 12A, the anti-reflection structure of Numerical Example 5 has sufficiently low reflectances, that is, a sufficiently high anti-reflection performance in the incident angle range from 0° to 45° over the entire visible wavelength range. Moreover, the anti-reflection structure of Numerical Example 5 has a low reflectance of about 5% at a high incident angle of 60° over the entire visible wavelength range. The reflectance gradually changes even in the infrared wavelength range, and the reflectance at the infrared wavelength of 1000 nm increases by only about 1.5% in the incident angle range from 0° to 30°.

Embodiment 6

Figure 6:
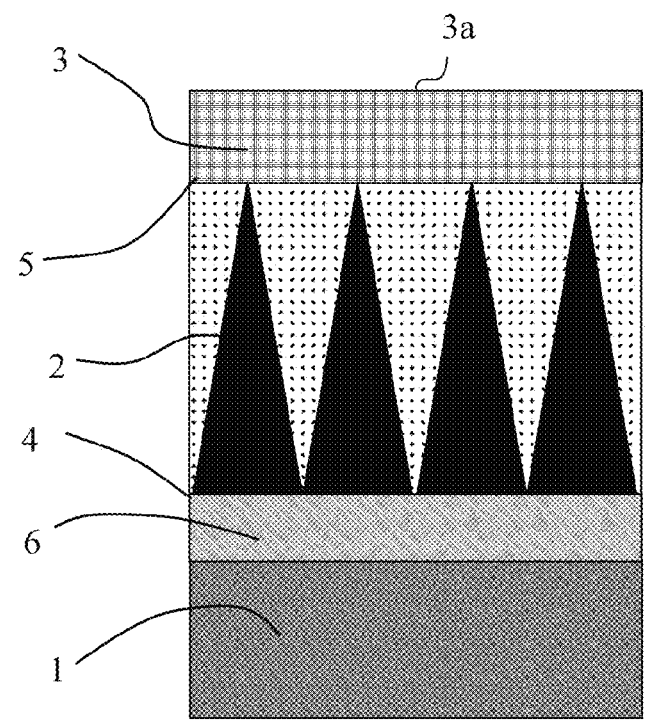
FIG. 6 shows an anti-reflection structure that is Embodiment 6 of the present invention.

A more detailed description will be made of the anti-reflection structure of Embodiment 6 (Numerical Example 6) with reference to FIG. 6. Tables 6 and 8 show designed values of Numerical Example 6.

This embodiment provides the graded refractive index layer 2 and the low refractive index layer 3 that are formed as well as those in Embodiment on the surface of the substrate 1 whose refractive index is 2.00, and provides a lower homogeneous layer (intermediate layer) 6 having an even refractive index of 1.80 between the substrate 1 and the graded refractive index layer 2.

The graded refractive index layer 2 has a refractive index of 1.60 at the substrate side interface 4 between the graded refractive index layer 2 and the lower homogeneous layer 6, which is a lower refractive index than that of the lower homogeneous layer 6. The refractive index of the graded refractive index layer 2 decreases from the substrate side interface 4 toward the low refractive index layer side interface 5. The refractive index of the graded refractive index layer 2 at the low refractive index layer side interface 5 is 1.32. The low refractive index layer 3 has a refractive index of 1.15.

In this embodiment, the hole rate of the hollow $MgF_2$ forming the low refractive index layer 3 is 60%. At the substrate side interface 4 of the graded refractive index layer 2, a content ratio of the petaloid structure ($Al_2O_3$) in the graded refractive index layer 2 and the mesoporous $SnO_2$ with which the concave area in the petaloid structure is filled is 58:42. On the other hand, at the low refractive index side interface 5 of the graded refractive index layer 2, a content ratio of the petaloid structure ($Al_2O_3$) and the mesoporous $SnO_2$ is 0:100. In this embodiment, the lower homogeneous layer 6 is formed of $Al_2O_3$.

Figure 9B:
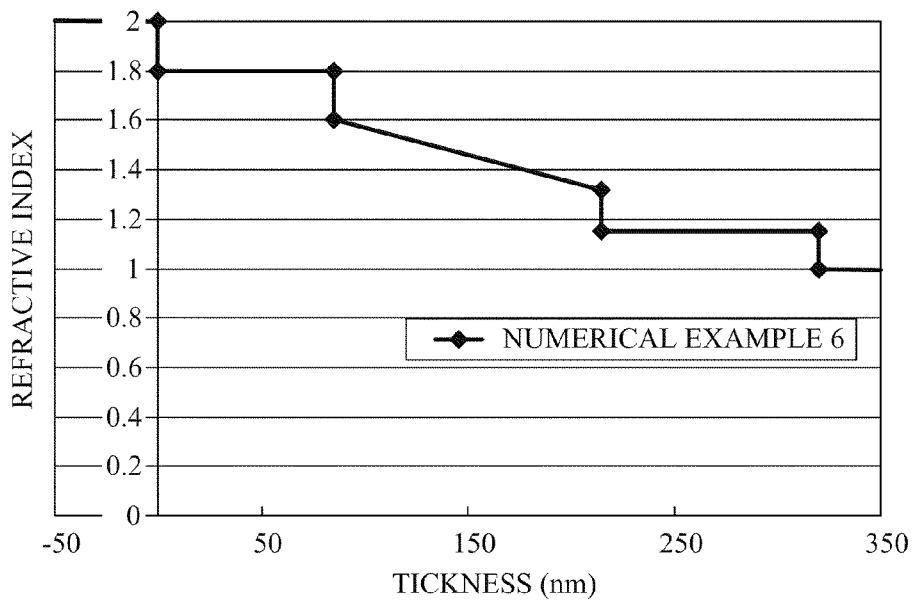
Figure 12B:
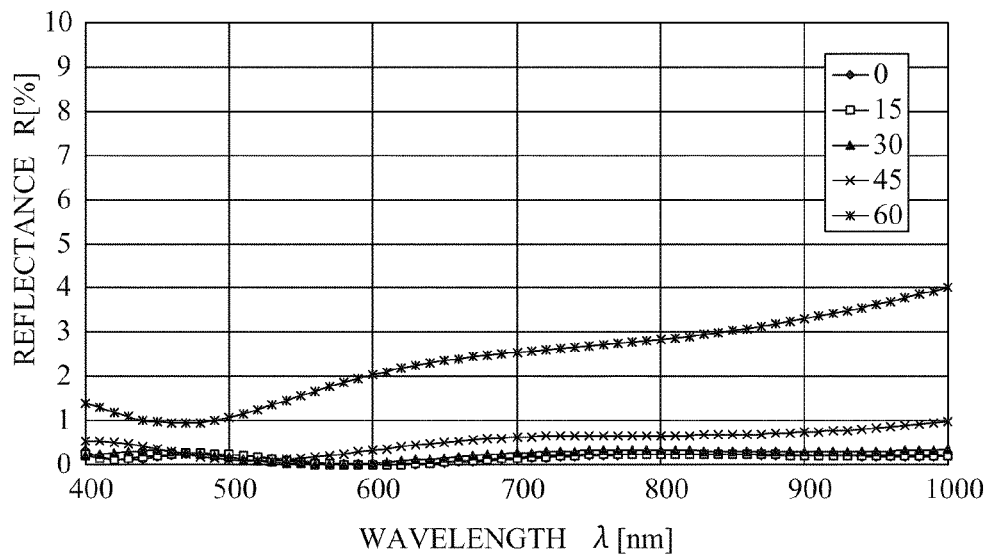

A refractive index profile of Numerical Example 6 is as shown in FIG. 9B, and spectral reflectances thereof are as shown in FIG. 12B.

As shown in FIG. 12B, the anti-reflection structure of Numerical Example 5 has sufficiently low reflectances, that is, a sufficiently high anti-reflection performance in the incident angle range from 0° to 45° over the entire visible wavelength range. Moreover, the anti-reflection structure of Numerical Example 5 has a low reflectance of about 2.5% at a high incident angle of 60° over the entire visible wavelength range. The reflectance gradually changes even in the infrared wavelength range, and the reflectance at the infrared wavelength of 1000 nm increases by only about 0.5% in the incident angle range from 0° to 30°.

Figure 13:
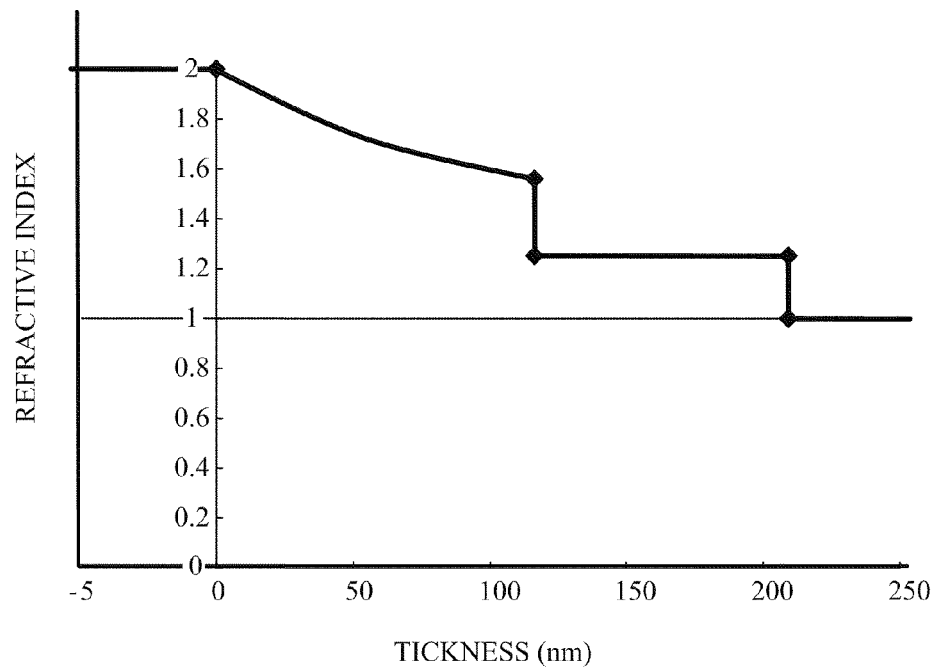
FIG. 13 shows another refractive index structure of Numerical Example 1.

The refractive index profile of the graded refractive index layer 2 of each numerical example only shows the maximum refractive index at the substrate side interface 4, the minimum refractive index at the low refractive index layer side interface 5 and a linear change of the refractive index therebetween. However, the change of the refractive index between the maximum and minimum refractive indices is not limited to such a linear change, and may be a curvilinear change as shown in FIG. 13 as long as it monotonically decreases.

For example, a curvilinear change of the refractive index is allowed from a viewpoint of actual manufacturing of the graded refractive index layer 2 or a viewpoint of proper tuning of spectrum reflectance characteristics.

Embodiment 7

Figure 17A:
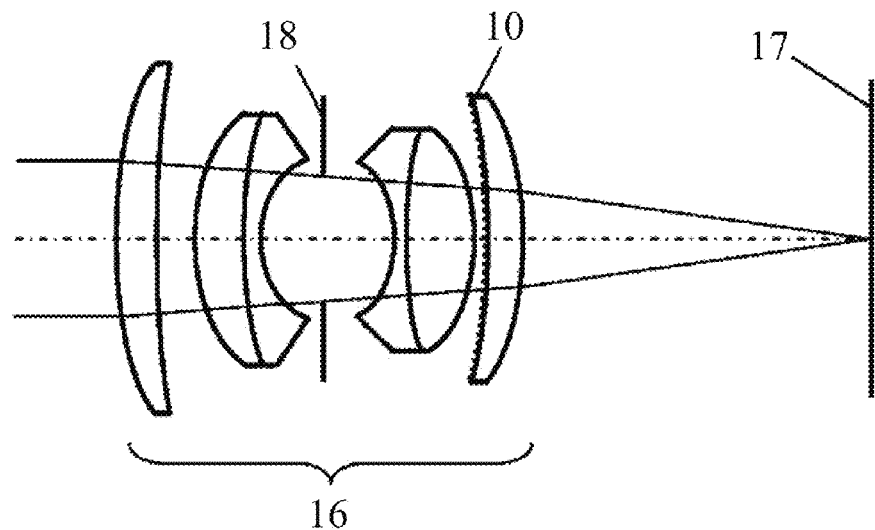
FIGS. 17A and 17B show optical apparatuses that are Embodiment 7 and use an optical element provided with the anti-reflection structure of any one of Embodiments 1-6.
Figure 17B:
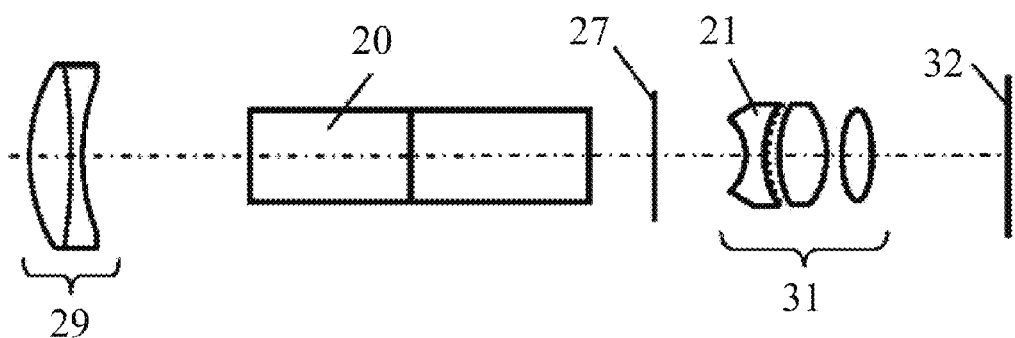

FIGS. 17A and 17B show examples of optical apparatuses using the anti-reflection structure of any one of the above-described embodiments.

FIG. 17A shows an image-forming optical system (image taking lens) for an image pickup apparatus such as a digital still camera and a video camera. The image-forming optical system is formed by using an optical element provided with the anti-reflection structure of any one of the above-described embodiments. Reference numeral 16 denotes the image-forming optical system including an aperture stop 18 and the optical element 10 provided with the anti-reflection structure. Reference numeral 17 denotes an image-forming plane of the image-forming optical system at which an image pickup element such as a CCD sensor is placed.

The optical element 10 is placed as a last lens at a position closest to the image-forming plane 17 in the image-forming optical system 16. The optical element 10 is provided with the anti-reflection structure on its light entrance surface (lens surface). The anti-reflection structure suppresses reflection of light on the light entrance surface to decrease flare light.

The optical element provided with the anti-reflection structure of each embodiment may be placed at positions other than the position of the last lens in the image-forming optical system, and a plurality of such optical elements may be provided in the image-forming optical system. Moreover, the optical element provided with the anti-reflection structure of each embodiment may be used in image-forming optical systems other than the image taking lens for the image pickup apparatus, such as a reader lens for an image scanner or for a copier.

FIG. 17B shows an observation optical system for binoculars (optical apparatus) that uses an optical element provided with the anti-reflection structure of any one of the above-described embodiment. Reference numeral 29 denotes an objective lens. Reference numeral 20 denotes a prism to erect an optical image. A developed figure of the prism 20 is shown in FIG. 17B. Reference numeral 27 denotes an aperture stop. Reference numeral 31 denotes an ocular lens (eyepiece lens) including the optical element 21 provided with the anti-reflection structure. Reference numeral 32 denotes an evaluation plane (pupil plane).

The optical element 21 is a lens, and is provided with the anti-reflection structure on its evaluation plane side lens surface. Part of light entering the ocular lens 31 from an evaluation plane side is reflected by at least one lens surface in the ocular lens 31 to be returned to an observer's eye (not shown). The anti-reflection structure decreases such returned light.

A plurality of the optical element provided with the anti-reflection structure may be used in the ocular lens 31. Moreover, the optical element provided with the anti-reflection structure may be a prism or a lens included in the objective lens. Furthermore, the optical element provided with the anti-reflection structure may be used for observation optical systems other than that for the binoculars, such as an observation optical system for a telescope and a viewfinder optical system for a camera.

TABLE 1

| | | | GRADED REFRACTIVE INDEX LAYER | | LOW REFRACTIVE INDEX LAYER | |
|---|---|---|---|---|---|---|
| | | | REFRACTIVE INDEX n | | | |
| | | SUBSTRATE REFRACTIVE INDEX n | SUBSTRATE SIDE | LOW REFRACTIVE INDEX LAYER SIDE | LAYER THICKNESS d [nm] | REFRACTIVE INDEX n | LAYER THICKNESS d [nm] |
| NUMERICAL EXAMPLE | 1 | 1.80 | 1.80 | 1.46 | 115 | 1.25 | 93 |
| | 2 | 1.80 | 1.80 | 1.49 | 130 | 1.20 | 97 |
| | 3 | 1.80 | 1.80 | 1.32 | 150 | 1.15 | 100 |
| | 4 | 2.00 | 2.00 | 1.56 | 95 | 1.25 | 93 |

TABLE 2

| | GRADED REFRACTIVE INDEX LAYER | | | | LOW REFRACTIVE INDEX LAYER |
|---|---|---|---|---|---|
| | SUBSTRATE SIDE | | LOW REFRACTIVE INDEX LAYER SIDE | | HOLE RATE OF MESOPOROUS |
| | $SiO_2$ [%] | $TiO_2$ [%] | $SiO_2$ [%] | $TiO_2$ [%] | SILICA [%] |
| NUMERICAL EXAMPLE 1 | 59 | 41 | 100 | 0 | 45 |
| NUMERICAL EXAMPLE 2 | 59 | 41 | 96 | 4 | 56 |
| NUMERICAL EXAMPLE 4 | 35 | 65 | 88 | 12 | 46 |

TABLE 3

| | GRADED REFRACTIVE INDEX LAYER | | LOW REFRACTIVE INDEX LAYER |
|---|---|---|---|
| | SUBSTRATE SIDE | LOW REFRACTIVE INDEX LAYER SIDE | HOLE RATE OF MESOPOROUS |
| | HOLE RATE OF MESOPOROUS $SnO_2$ [%] | | SILICA [%] |
| NUMERICAL EXAMPLE 1 | 20 | 54 | 46 |
| NUMERICAL EXAMPLE 2 | 20 | 51 | 56 |
| NUMERICAL EXAMPLE 3 | 20 | 68 | 67 |
| NUMERICAL EXAMPLE 4 | 0 | 44 | 46 |

TABLE 4

| | FILLING RATE AT TOP END OF TRUNCATED CONE OR PYRAMID | HOLE RATE OF MESOPOROUS SILICA [%] |
|---|---|---|
| NUMERICAL EXAMPLE 1 | 38 | 46 |
| NUMERICAL EXAMPLE 2 | 48 | 56 |
| NUMERICAL EXAMPLE 3 | 26 | 67 |
| NUMERICAL EXAMPLE 4 | 41 | 46 |

TABLE 5

| | HOLE RATE OF MESOPOROUS $SnO_2$ [%] | HOLE RATE OF HOLLOW $MgF_2$ |
|---|---|---|
| NUMERICAL EXAMPLE 1 | 54 | 34 |
| NUMERICAL EXAMPLE 2 | 51 | 47 |
| NUMERICAL EXAMPLE 3 | 68 | 60 |

TABLE 6

| | LOWER HOMOGENEOUS LAYER | | GRADED REFRACTIVE INDEX LAYER REFRACTIVE INDEX n | | LAYER THICKNESS d [nm] | LOW REFRACTIVE INDEX LAYER | |
|---|---|---|---|---|---|---|---|
| | SUBSTRATE REFRACTIVE INDEX n | REFRACTIVE INDEX n | LAYER THICKNESS d [nm] | SUBSTRATE SIDE | LOW REFRACTIVE INDEX LAYER SIDE | REFRACTIVE INDEX n | LAYER THICKNESS d [nm] |
| NUMERICAL EXAMPLE 5 | 2.00 | 1.80 | 85 | 1.60 | 1.46 | 95 | 1.25 | 93 |
| NUMERICAL EXAMPLE 6 | 2.00 | 1.80 | 85 | 1.60 | 1.32 | 130 | 1.15 | 105 |

TABLE 7

| | GRADED REFRACTIVE INDEX LAYER | | | | LOW REFRACTIVE INDEX LAYER |
|---|---|---|---|---|---|
| | SUBSTRATE SIDE | | LOW REFRACTIVE INDEX LAYER SIDE | | HOLE RATE OF MESOPOROUS SILICA [%] |
| | $SiO_2$ [%] | $TiO_2$ [%] | $SiO_2$ [%] | $TiO_2$ [%] | |
| NUMERICAL EXAMPLE 5 | 83 | 17 | 100 | 0 | 46 |

TABLE 8

| | FILLING RATE AT LOWER PORTION OF PETALOID STRUCTURE | HOLE RATE OF MESOPOROUS $SnO_2$ [%] | HOLE RATE OF HOLLOW $MgF_2$ |
|---|---|---|---|
| NUMERICAL EXAMPLE 6 | 58 | 68 | 60 |

TABLE 9

| | CONDITION (1) $n_b - n_a$ | CONDITION (2) $n_a$ | CONDITION (3) $|n_s - n_c|$ | CONDITION (4) $n_a * D_a/\lambda_0$ |
|---|---|---|---|---|
| NUMERICAL EXAMPLE 1 | 0.21 | 1.25 | 0.00 | 0.26 |
| NUMERICAL EXAMPLE 2 | 0.29 | 1.20 | 0.00 | 0.28 |
| NUMERICAL EXAMPLE 3 | 0.17 | 1.15 | 0.00 | 0.31 |
| NUMERICAL EXAMPLE 4 | 0.31 | 1.25 | 0.00 | 0.22 |
| NUMERICAL EXAMPLE 5 | 0.21 | 1.25 | — | 0.22 |
| NUMERICAL EXAMPLE 6 | 0.17 | 1.15 | — | 0.27 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-084739, filed Apr. 1, 2010 which is hereby incorporated by reference herein in its entirety.

What is claimed is:

1. An anti-reflection structure comprising:
   a first layer that is a graded refractive index layer which is disposed on a substrate and whose refractive index decreases as a distance from the substrate increases;
   a second layer that is disposed on the first layer and whose refractive index is homogeneous, wherein refractive index of the second layer is na and $1.10 < na < 1.35$, and
   an interface between the first layer and the second layer, wherein the following condition is satisfied at the interface:

$$nb - na > 0.10$$

where nb represents refractive index of the first layer at the interface between the first layer and the second layer.

2. An anti-reflection structure according to claim 1, wherein the second layer is a porous layer.

3. An anti-reflection structure according to claim 2, wherein the second layer contains silica or magnesium fluoride.

4. An anti-reflection structure according to claim 2, wherein the second layer is a mesoporous layer.

5. An anti-reflection structure according to claim 1, wherein the following condition is satisfied:

$$|ns - nc| < 0.10$$

where ns represents a refractive index of the substrate, and nc represents refractive index of a part of the first layer that is adjacent to the substrate.

6. An anti-reflection structure according to claim 1, further comprising:
   a third layer that is disposed between the first layer and the substrate and whose refractive index is homogeneous.

7. An anti-reflection structure according to claim 1, wherein the first layer is constituted by (a) a base layer having roughness including convex portions whose pitch is equal to or smaller than a wavelength of light entering the anti-reflection structure, and (b) a first medium with which a concave area around the convex portions in the base layer is filled and whose refractive index is lower than the base layer,
   wherein a filling rate of the first medium increases as a distance from the substrate increases.

8. An anti-reflection structure according to claim 7, wherein the base layer is formed of a same medium as that of the substrate.

9. An anti-reflection structure according to claim 7, wherein the first medium is a same medium as that of the second layer.

10. An anti-reflection structure according to claim 1, wherein the following condition is satisfied:

$$0.1 < na \cdot Da/\lambda o < 0.5$$

where Da represents a thickness of the second layer, and $\lambda o$ is 550 nm.

11. An anti-reflection structure according to claim 1, wherein the following condition is satisfied:

$$nb - na > 0.17.$$

12. An anti-refection structure according to claim 1, wherein the interface is configured so that light reflected by the interface and light reflected by an interface between second layer and air cancel each other.

13. An anti-reflection structure according to claim 1, wherein nb is the minimum effective refractive index in the first layer.

14. An optical element comprising:
    a substrate;
    a first layer that is a graded refractive index layer which is disposed on a substrate and whose refractive index decreases as a distance from the substrate increases;
    a second layer that is disposed on the first layer and whose refractive index is homogeneous, wherein refractive index of the second layer is na and $1.10 < na < 1.35$, and
    an interface between the first layer and the second layer, wherein the following condition is satisfied at the interface:

$$nb - na > 0.10$$

where nb represents refractive index of the first layer at the interface between the first layer and the second layer.

15. An optical apparatus comprising:
    an optical element; and
    an image pickup element
    wherein the optical element comprises:
    a substrate;
    a first layer that is a graded refractive index layer which is disposed on a substrate and whose refractive index decreases as a distance from the substrate increases;
    a second layer that is disposed on the first layer and whose refractive index is homogeneous, wherein refractive index of the second layer is na and $1.10 < na < 1.35$, and
    an interface between the first layer and the second layer, wherein the following condition is satisfied at the interface:

$$nb - na > 0.10$$

where nb represents refractive index of the first layer at the interface between the first layer and the second layer.

* * * * *